J. SCHNEIDER.
AUTOMOBILE TIRE CHAIN AND HOLDER.
APPLICATION FILED JULY 7, 1918.

1,346,469.

Patented July 13, 1920.

Inventor
Joseph Schneider
By Allen & Allen
Attorneys.

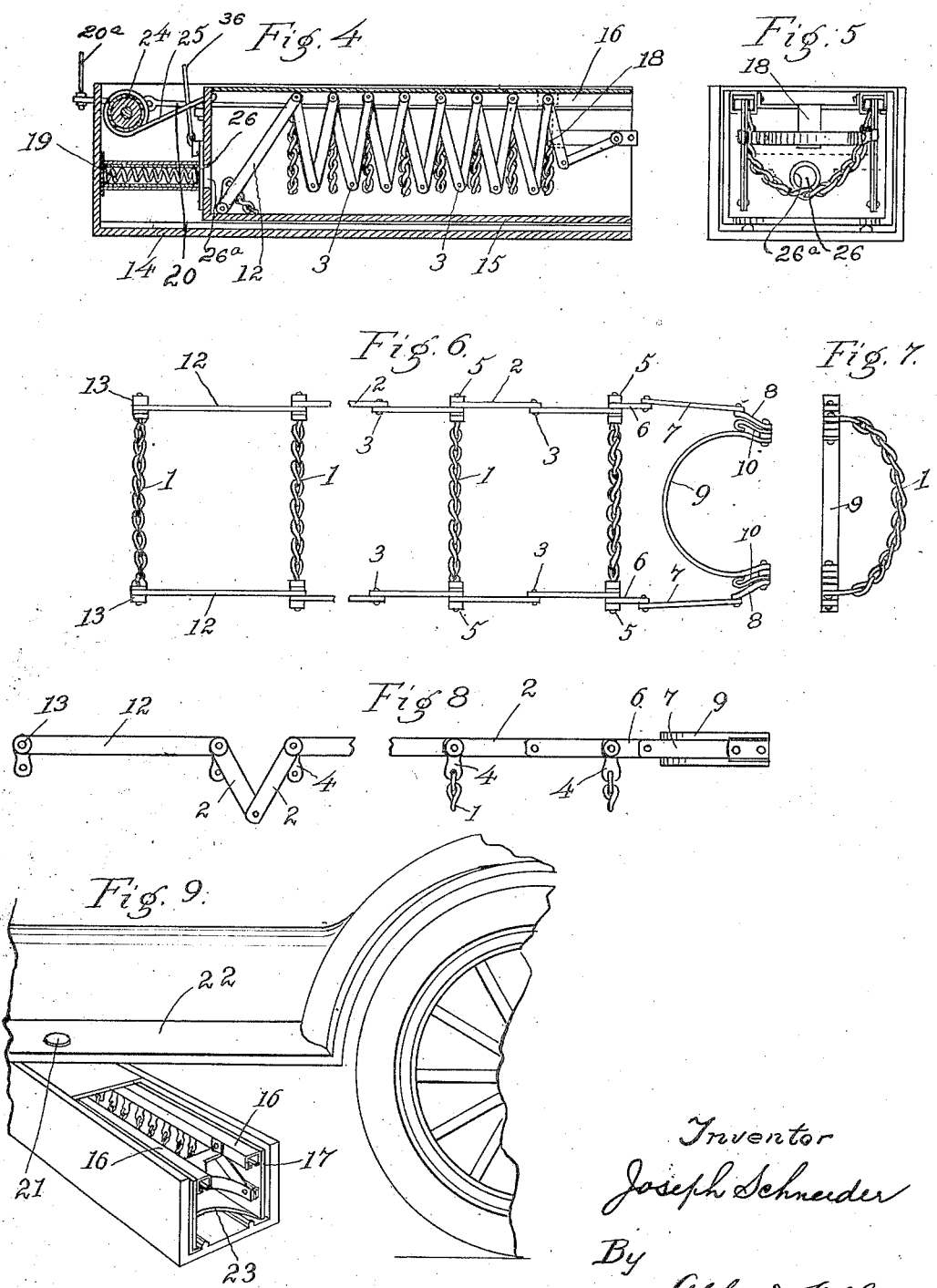

UNITED STATES PATENT OFFICE.

JOSEPH SCHNEIDER, OF CINCINNATI, OHIO.

AUTOMOBILE-TIRE CHAIN AND HOLDER.

1,346,469.　　　Specification of Letters Patent.　　Patented July 13, 1920.

Application filed July 3, 1918. Serial No. 243,122.

*To all whom it may concern:*

Be it known that I, JOSEPH SCHNEIDER, a citizen of the United States, and a resident of Cincinnati, in the county of Hamilton and State of Ohio, have invented certain new and useful Improvements in Automobile-Tire Chains and Holders, of which the following is a full, clear, and exact description, reference being had to the accompanying drawings, forming part of this specification.

The object of my invention is to provide a construction of chain for pneumatic tires to prevent skidding, which may be automatically applied to the wheel while the car is in motion, so that if it becomes necessary or advantageous to apply the chain to the wheels, this may be accomplished at a moment's notice and without even stopping the car.

My improvements embody both an improved construction of chain in which the ordinary chain cross links are provided in connection with folding side links, and further in the construction of a case or container for the chain when not in use which may be secured underneath the running board of the machine, together with devices with which the chain may be automatically delivered from the container and applied to the wheel.

The invention consists of that certain novel construction and arrangement of parts to be hereinafter particularly pointed out and claimed in which the above results are attained.

In the drawings:

Fig. 4 is a longitudinal section of same.

Fig. 5 is an end view thereof.

Fig. 6 is a plan view of the chain removed from the box partly broken away and showing the end portions.

Fig. 7 is an end view of the same.

Fig. 8 is a side elevation of the chain as shown in Fig. 6.

Fig. 9 is a perspective view of a portion of the side of an automobile showing the container and the method of its pivoted attachment to the running board.

Fig. 10 is a perspective view of the inner end of the container box with the side wall of the outer box removed.

Fig. 11 is a cross section of the box as shown in Fig. 10, taken on the line 11, 11.

Fig. 12 is a similar perspective view to that shown in Fig. 10, with a portion of the inner container removed and illustrated in its extended position.

Fig. 13 is a central longitudinal section of the tension spring construction by means of which the inner container is projected from the casing.

Fig. 14 is a horizontal section of the tire casing showing the application of the last link to the tire.

Figure 1:
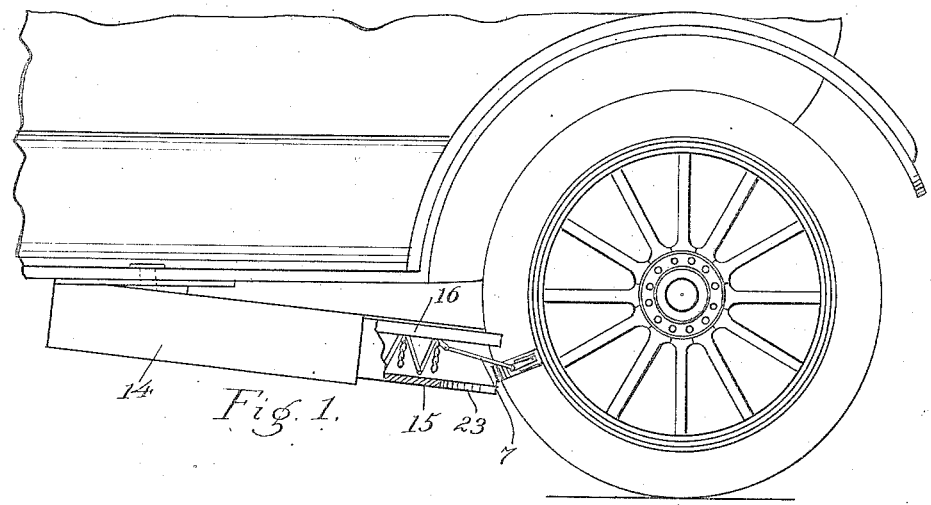
Figure 1 is a side elevation of the rear wheel of an automobile showing the tire chain container with the casing therefor partially broken away and the chain at the commencement of its attachment to the tire.

The chain itself is made up of the usual cross links 1, 1, which are arranged the usual distance apart for such cross links. Except for the end side links of the chain, all the intermediate side links comprise side pieces 2, 2, hinged together at 3 so that the side links may be folded together to bring the cross chain members into close proximity. The cross chains 1 are each coupled to the end link 4 and these end links are pivoted to the side links 2 between the pivots 3, 3, and at the pivotal points of the cross chains washers or collars 5, 5, are provided, which serve as guide rollers in mounting the chain in the holder as will be hereinafter described.

For the end of the chain which is first applied to the tire, short links 6, 6, pivoted to much longer links 7, 7, are employed, and the outer ends of these long links 7, 7, are pivoted by short links 8, 8, to a spring band 9. The diameter of this spring band at its open end is somewhat less than the diameter of the pneumatic tire to which the chain is to be applied, so that, as will be hereinafter explained, when this band 9 is pushed over the tire, it will grip the tire and be held in place. Pivoted to the short links 8, 8, with the band 9, are hook plates 10, 10.

The opposite end of the chain is provided with single straight links 12, 12, preferably about the length of the intermediate foldable links when extended, and at the outer end of these long links 12, 12, a cross chain is also provided coupled in the same way to the side links as the intermediate cross chains, and provided with the guide rollers 13, 13.

The chain as above described can, of course, be applied to the tire by hand, and much more expeditiously and conveniently than with the present chains in common use. To apply the chain by hand, the band 9 will be pushed over the tire, and then the wheel turned gradually feeding the chain on the tire until the final side links 12, 12, are reached, and these side links can be caught by the hooks 10, and the chain will be secured to the tire, the roller washers 13 at the ends of the side links 12 preventing the links from falling through the hooks 10, 10.

The construction of chain with the folding side links is particularly adapted, however, to permit the chain to be folded up into small compass and held in a container from which it may be very rapidly drawn and can be automatically applied.

To accomplish this I provide a suitable box or casing 14, open at one end, and in this box so as to be adapted to slide in and out like a drawer in a desk is a smaller box 15 of slightly smaller dimensions so as to be adapted to slide easily into and out of the casing 14 through the open end.

Along the side walls of this inner container 15 are secured the guide tubes 16, 16, on either side. The side edges of the tubes do not come together, but leave a longitudinal slot 17 in the lower face of the guide tubes. The chain can be packed in this inner box by folding the side links as illustrated in Fig. 4, and slipping the roller guides successively into these tubes with the end chain links also projecting downwardly through the slot 17. When the chain has thus been folded up and pushed into the inner sliding container 15, the band link 9 will be held in horizontal position, as illustrated in Fig. 4, by a hook plate 18.

I provide the drawer or inner box 15 with spring means for forcing it forward, so as to clamp the band 9 around the casing of the tire, and also to withdraw the box after the chain has been deposited. For replacing the chain in the inner box and arranging the parts for a new operation I mount the entire container on a pivot 21 underneath the running board of the car, so that it can be swung outwardly, thereby permitting the operator to pack in the chain and links. Further mention will be made of this after describing the automatic operations.

As shown in Fig. 4, there is provided a tubular housing and spring 19, which bears against a plate 26 pivoted to the back of the inner box. This plate can be swung out of the way of the spring by means of a handle 36, which will permit the spring to extend itself within the box, passing through a hole 26$^a$ covered by the plate when in normal position.

The inner container is also connected by a cord or cords 25 with a spring roller 24, which acts to draw the said container back in the box. The inner end of the said container has also a suitable engaging lip or lug for a hook 20, which holds it in retracted position, subject to release by pressing down on a lever or link 20$^a$ connected to the hook back of its pivot, and running upwardly to some convenient point of operation.

To release the inner container for an operation after the chain has been packed in, the lever 20$^a$ is depressed, so as to permit the spring 19 to force the same forwardly, thereby bringing the band 9 up against the casing of the tire, to which the device has been adjusted. The end of the inner container has a semicircular recess to permit of it moving to a position of partial contact with the surface of the casing.

The revolution of the wheel will then withdraw the chain by pulling the links on their rollers in the member 16 of the inner container toward the casing, coming at last to the long links at the end of the chain, as it lies in the box. Due to the position of the inner container or drawer against the casing and the length of the chain, the long links will be delivered, as pulled from the box, along the sides of the casing in the proper position to be pulled down behind the hooks 10.

Figure 2:
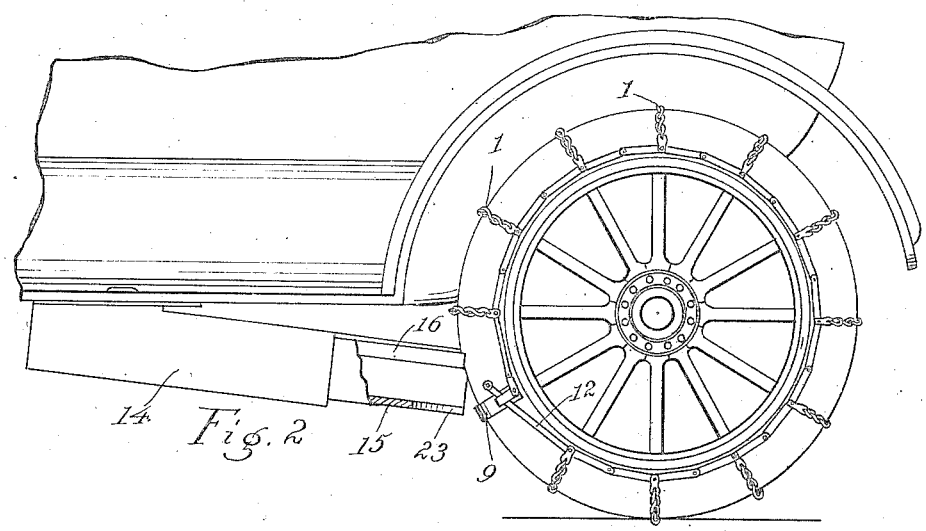
Fig. 2 is a similar view showing the chain applied to the tire.
Figure 3:
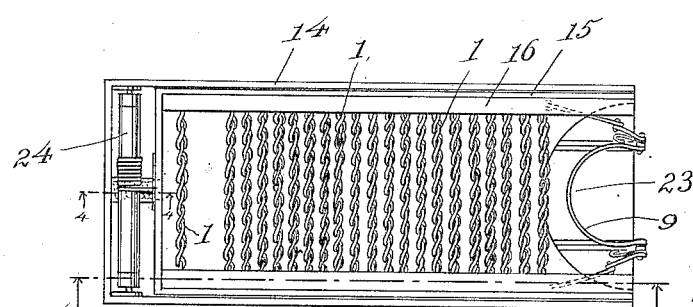
Fig. 3 is a top plan view of the container box with the chain in place.

It will be necessary for the operator in the structure shown to press the long links behind the hooks 10. He may do this in any convenient position of the chain, however, since when the wheel is moving forward, the unengaged ends of the chain device will remain in place on the tire until they have entirely passed their uppermost position on the wheel. The clamp 9 holds the chain in place at one end, and gravity holds the free end of the chain in place, and will result in its arranging itself in place should it fall to the ground when the parts are in the position shown in Fig. 2.

The result of this operation is that the chain will be firmly but loosely engaged around the tire, and will remain so during the operation of the wheel. To retract the inner container, however, it is necessary to lift up the small plate 26, thereby permitting the spring 19 to thrust itself through the hole in the back of the said container, so that the spring roller can withdraw it to latching position. The operator can determine if the latch has caught by manipulating the lever 20$^a$.

To repack the chain, it must be withdrawn from the tire, by disengaging the hooks from the long links, and then packing it away in the inner container. The operations will be to swing out the whole device, and pull the inner drawer forward. The inner container is then filled, the plate 26 dropped and the said inner container forced back into the main container, until the latch can come into play, when the parts are ready for another operation.

Having thus described my invention, what I claim as new and desire to secure by Letters Patent, is:—

1. In an automobile tire chain and holder, a tire chain comprising cross links with longitudinal side links to which the cross links are secured, said side links made up in sections hinged to each other to fold longitudinally to gather the cross links into close proximity to each other, and a container to hold the chain when folded comprising a fixed section and a movable section, with slotted guideways in the movable section to receive and hold the chain when folded, with means for projecting the movable section from the fixed section to cause the chain to automatically grasp the tire to be drawn from the container.

2. In an automobile tire chain and holder, a tire chain comprising cross links with longitudinal side links to which the cross links are secured, said side links made up in sections hinged to each other to fold longitudinally to gather the cross links into close proximity to each other, one end of each chain provided with a spring band to grasp the tire, and a container to hold the chain when folded comprising a fixed section and a movable section with slotted guideways in the movable section to receive and hold the chain when folded, with means for projecting the movable section from the fixed section to cause the band to automatically grasp the tire to be drawn from the container.

JOSEPH SCHNEIDER.